United States Patent

Honda

(10) Patent No.: US 7,561,204 B1
(45) Date of Patent: Jul. 14, 2009

(54) METHOD FOR INTERPOLATING BETWEEN SCANNING LINES OF A VIDEO SIGNAL

(75) Inventor: Hirofumi Honda, Yamanashi-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/243,536

(22) Filed: Feb. 3, 1999

(30) Foreign Application Priority Data

Mar. 9, 1998 (JP) .................. 10-076607

(51) Int. Cl.
*H04N 7/01* (2006.01)

(52) U.S. Cl. ................ 348/448; 348/452; 348/451; 348/459; 382/300

(58) Field of Classification Search ............... 348/448, 348/441, 443, 451, 452, 458, 459, 445, 446; 382/300, 236; 375/240.16, 240.01; *H04N 7/01*
See application file for complete search history.

(56) References Cited

U.S. PATENT DOCUMENTS

| | | | | |
|---|---|---|---|---|
| 4,985,764 | A * | 1/1991 | Sato | 358/105 |
| 5,402,186 | A * | 3/1995 | Kawai | 348/448 |
| 5,428,397 | A * | 6/1995 | Lee et al. | 348/448 |
| 5,446,498 | A * | 8/1995 | Boon | 348/448 |
| 5,483,288 | A * | 1/1996 | Hong | 348/448 |
| 5,488,421 | A * | 1/1996 | Hwang et al. | 348/448 |
| 5,504,531 | A * | 4/1996 | Knee et al. | 348/452 |
| 5,534,934 | A * | 7/1996 | Katsumata et al. | 348/445 |
| 5,796,437 | A * | 8/1998 | Muraji et al. | 348/452 |
| 5,838,381 | A * | 11/1998 | Kasahara et al. | 348/458 |
| 5,886,745 | A * | 3/1999 | Muraji et al. | 348/448 |
| 5,943,099 | A * | 8/1999 | Kim | 348/448 |
| 6,219,104 | B1 * | 4/2001 | Shirahama et al. | 348/458 |
| 6,262,773 | B1 * | 7/2001 | Westerman | 348/448 |
| 6,281,873 | B1 * | 8/2001 | Oakley | 345/127 |

FOREIGN PATENT DOCUMENTS

| | | |
|---|---|---|
| JP | 63-187785 | 3/1988 |
| JP | 01-186087 | 7/1989 |

* cited by examiner

*Primary Examiner*—David L Ometz
*Assistant Examiner*—Jean W Désir
(74) *Attorney, Agent, or Firm*—Arent Fox LLP

(57) ABSTRACT

Values of actual pixels existing on upper and lower scanning lines of a pixels to be interpolated are detected, and a differential of each of the actual pixels is calculated. Each of the actual pixels is weighted in accordance with the differential and both the weighted values of the pixels are added together. The sum of the addition is used as a value of the pixel to be interpolated.

6 Claims, 4 Drawing Sheets

FIG.6 a

| n−1 LINE | 0 | 1 | 2 | 2 | 2 |
|---|---|---|---|---|---|
| n LINE (INTERPOLATION LINE) | 0 | 0 | 1 | 2 | 2 |
| n+1 LINE | 0 | 0 | 0 | 1 | 2 |

FIG.6 b

| n−1 LINE | 0 | 1 | 2 | 2 | 2 |
|---|---|---|---|---|---|
| n LINE (INTERPOLATION LINE) | 0 | 0.5 | 1 | 1.5 | 2 |
| n+1 LINE | 0 | 0 | 0 | 1 | 2 |

METHOD FOR INTERPOLATING BETWEEN SCANNING LINES OF A VIDEO SIGNAL

BACKGROUND OF THE INVENTION

The present invention relates to a method for interpolating between scanning lines of a video signal, and more particularly to a method suitable for converting a video signal such as the NTSC television signal and PAL television signal, which is obtained by skip scanning, into a progressive scanning video signal.

In the field of the interlace video signal, scanning signals are arranged on every other line. Therefore, in order to convert the interlace video signal into the progressive scanning video signal, it is necessary to insert a scanning signal in the gap between adjacent scanning lines by interpolation.

An interpolation method is known, wherein the gap is interpolated with a corresponding pixel of an adjacent field in the case of the still picture, the gap is interpolated with an average of pixels of adjacent scanning lines in the same field in the case of the moving picture.

However, in accordance with the interpolation with the average, a slant contour and a moving slant contour are displayed in zigzag, so that the picture is deteriorated in sharpness.

SUMMARY OF THE INVENTION

An object of the present invention is to provide a scanning line interpolation method which may produce a progressive scanning picture excellent in displaying a slant contour and a moving slant contour.

According to the present invention, there is provided a method for interpolating between scanning lines of a video signal, the steps comprising detecting values of actual pixels existing on upper and lower scanning lines of a pixel to be interpolated, obtaining a differential of each of the actual pixels, weighting each of the actual pixels in accordance with the differential, adding together the weighted values of the pixels, calculating a value of the pixel to be interpolated based on a sum of the addition.

These and other objects and features of the present invention will become more apparent from the following detailed description with reference to the accompanying drawings.

BRIEF DESCRIPTION OF DRAWINGS

FIGS. 6a and 6b show values of various pixels.

DETAILED DESCRIPTION OF THE PREFERRED EMBODIMENT

Figure 1:
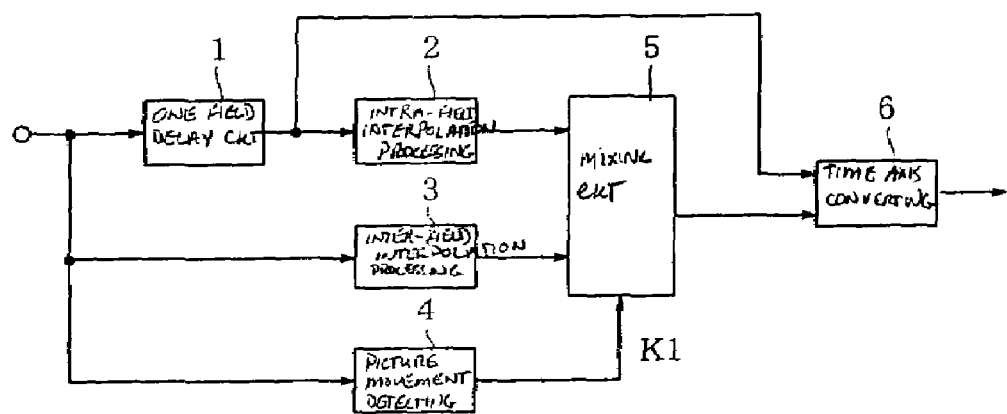
FIG. 1 is a block diagram showing a video signal processing system to which a first embodiment of the present invention is applied.

Referring to FIG. 1 showing the video signal processing system for the first embodiment of the present invention comprises a one-field delay circuit 1, an intra-field interpolation processing circuit 2, an inter-field interpolation processing circuit 3, and a picture movement detecting circuit 4. A skip-scanned input video signal is applied to the one-field delay circuit 1, inter-field interpolation processing circuit 3, and picture movement detecting circuit 4.

The picture movement detecting circuit 4 detects the movement of the picture from the movement of the input signal with respect to time to produce a movement coefficient K1 which is applied to a mixing circuit 5.

The intra-field interpolation processing circuit 2 produces a first interpolation scanning signal, and the inter-field interpolation processing circuit 3 produces a second interpolation scanning signal as described hereinafter.

The mixing circuit 5 multiplies the first interpolation video signal by the coefficient K1 and multiplies the second interpolation video signal by the coefficient (1−K1), and mixes the products to produce a mixture. The mixture is applied to a time axis converting circuit 6 as an interpolation video signal.

In the case of the still picture, since the field correlation becomes maximum, the coefficient K1 is set zero, and the second interpolation video signal is produced as an interpolation scanning signal, In the case of the moving picture, the coefficient K1 is set O<K1≦1 in accordance with the movement.

The time axis converting circuit 6 inserts the interpolation scanning signal from the mixing circuit 5 between the actual scanning lines which are delayed one field by the one-field delay circuit 1.

Figure 2:
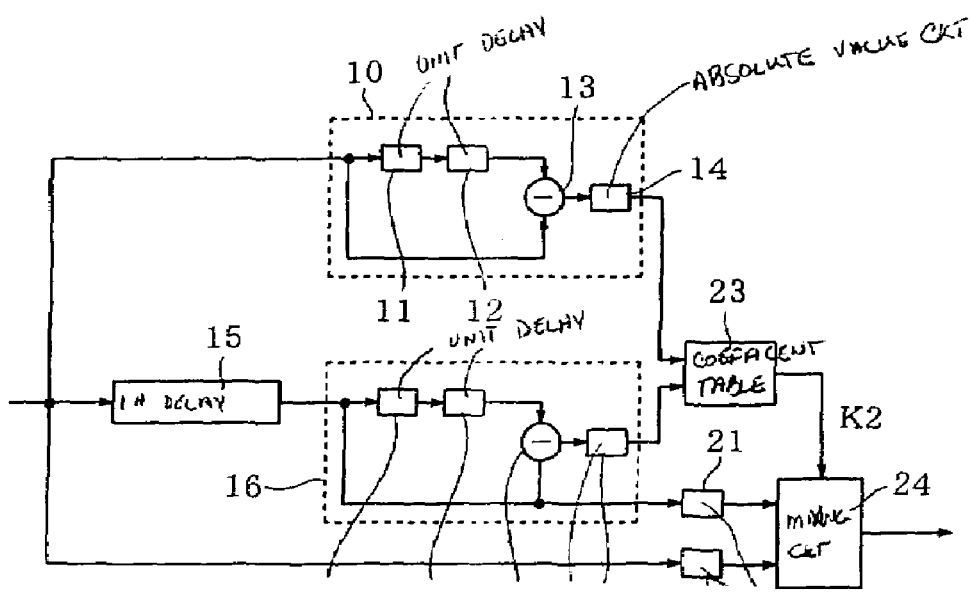
FIG. 2 is a block diagram showing an intra-field interpolation circuit.

FIG. 2 shows the intra-field interpolation processing circuit 2. The actual scanning signals of a field, for example an odd field, which are delayed one field by the one-field delay circuit 1 are applied to a 1H (one horizontal scanning time) delay circuit 15, a first differential detecting circuit 10 and a unit delay circuit 22, respectively.

The first differential detecting circuit 10 comprises unit delay circuits 11 and 12, a subtracter 13, and an absolute value circuit 14. The difference (differential) between the input signal and the two units delay signal by the unit delay circuit 11 is produced by the subtracter 13, and an absolute value of the difference is applied from the absolute value circuit 14 to a coefficient table 23 as a first differential.

In the case that each of the unit delay circuits 11 and 12 operates to delay a pixel by one-pixel, an absolute value of the difference between pixel values of pixels of opposed sides of a present first pixel on a present line of an interpolation process field (interpolation field) is produced from the first differential detecting circuit 10 as a first differential (horizontal differential) of the present first pixel.

Figures 3, 4:
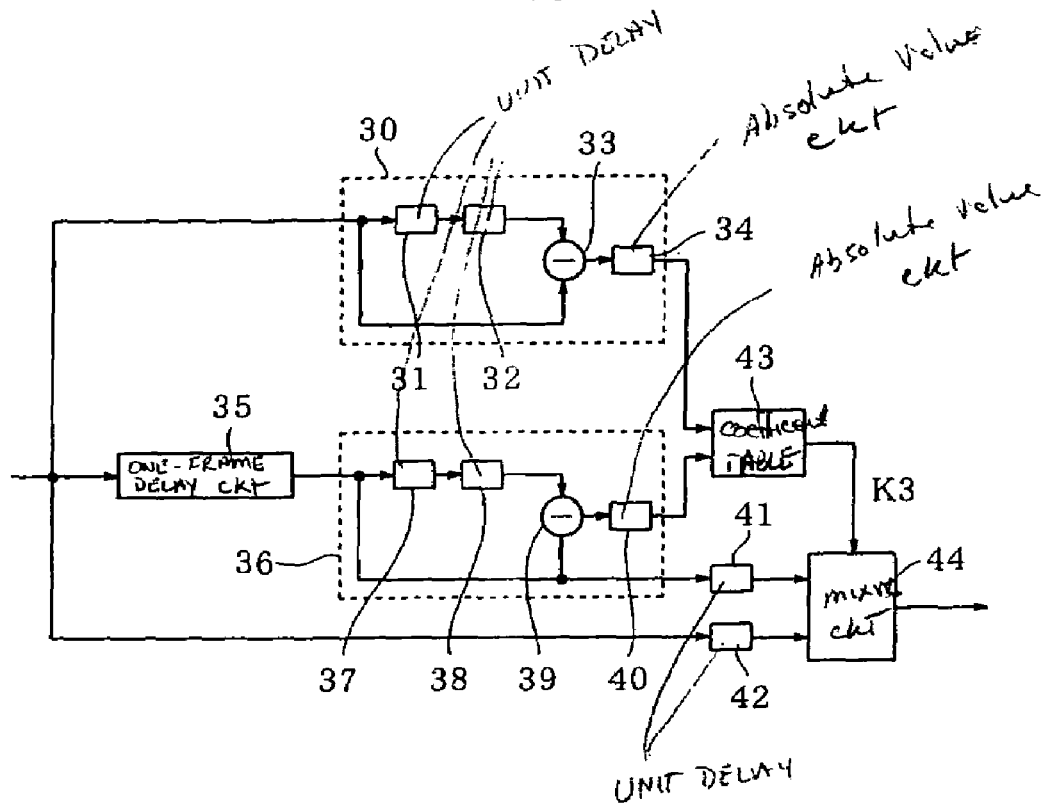
FIG. 3 is a block diagram showing an inter-field interpolation circuit.
FIG. 4 is a chart for explaining the operation of each circuit.

For example, in FIG. 4, the difference between a pixel value of a pixel b1 and a pixel value of a pixel b3 on opposite sides of a present pixel p2 on present odd scanning line n−1 is produced as an absolute value.

In the case that each of the unit delay circuits 11 and 12 operates to delay a scanning line by 1H (one horizontal scanning time), an absolute value of the difference between pixel values of scanning lines on opposite sides of a central scanning line is produced from the first differential detecting circuit 10 as a differential (vertical differential) of the present first pixel.

A second differential detecting circuit 16 comprises unit delay circuits 17 and 18, a subtracter 19 and an absolute value circuit 20. The difference (differential) between the input signal which is delayed by one horizontal scanning time by the 1H delay circuit 15 and the two units delay signal is produces by the subtracter 19, and an absolute value of the difference is applied from the absolute value circuit 20 to the coefficient table 23 as a second differential.

In the case that each of the unit delay circuits 17 and 18 operates to delay a pixel by one-pixel, an absolute value of the difference between pixel values of pixels of opposed sides of a present pixel on a one-line precedent (has preceded by one line) is produced from the second differential detecting circuit 16 as a second differential (horizontal differential) of the present second pixel.

In the case that each of the unit delay circuits 17 and 18 operates to delay a scanning line by 1H (one horizontal scanning time), an absolute value of the difference between pixel values of scanning lines on opposite sides of a central scanning line is produced from the second differential detecting circuit 16 as a second differential (vertical differential) of the present second pixel.

The coefficient table 23 calculates the mixing ratio of upper and lower adjacent present pixel values in accordance with the first differential and the second differential.

In the case that the first differential is larger than the second differential, the mixing ratio K2 of the second pixel is set in a range of $0.5 < K2 \leq 1$. If the second differential is larger than the first differential, the mixing ratio K2 of the second pixel is set in a range of $0 \leq K2 < 0.5$. When the first differential is equal to the second differential, the mixing ratio K2 of the second pixel is set about 0.5.

Namely, the coefficient table 23 sets the mixing ratio (1−K2) of the first pixel and the mixing ratio K2 of the second pixel so that the mixing ratio of the small absolute value of the differential becomes large.

The output of the 1H delay circuit 15 is applied to a mixing circuit 24 through a unit delay circuit 21, and the input signal is also applied to the mixing circuit 24 through the unit delay circuit 22.

The mixing circuit 24 multiplies the signal from the unit delay circuit 21 by K2 and multiplies the signal from the unit delay circuit 22 by (1−K2). The multiplying means weighting of the signal. The products are added together, and the signal of the addition is output as a first interpolation scanning signal.

Namely, the actual scanning signal (value of a first pixel) in the interpolation field and the actual scanning signal (value of a second pixel) of one-line (1H) preceding line are multiplied so that the mixing ratio of the differential of small absolute value becomes large.

FIG. 3 shows a composition of the inter-field interpolation processing circuit 3.

The input signal is fed to a one-frame delay circuit 35, a third differential detecting circuit 30, and a unit delay circuit 42.

The third differential detecting circuit 30 comprises unit delay circuits 31 and 32, a subtracter 33 and an absolute value circuit 34.

The absolute value of the difference signal (differential) between the actual scanning signal of a one-field later field from the interpolation field and the two-unit delayed actual scanning signal is produced from the third differential detecting circuit 30 and is fed to a coefficient table 43.

In the case that each of the unit delay circuits 31 and 32 operates to delay a pixel by one-pixel, an absolute value of the difference between pixel values of opposite sides of a present third pixel of the actual scanning signal in the one-field later field from the interpolation field is produced from the third differential detecting circuit 30 as a third differential (horizontal differential) of the first pixel.

In the case that each of the unit delay circuits 31 and 32 operates to delay a scanning line by 1H (one horizontal scanning time) an absolute value of the difference between pixel values of scanning lines on opposite sides of a central scanning line is produce from the third differential detecting circuit 30 as a differential (vertical differential) of the present third pixel.

The fourth differential detecting circuit 36 comprises unit delay circuits 37 and 38, a subtracter 39 and an absolute value circuit 40.

The absolute value of the difference signal (differential) between the actual scanning signal of a one-field preceding field from the signal delayed one-frame delayed by the one-frame delay circuit 35 (interpolation field) and the two-unit delayed actual scanning signal is produced from the fourth differential detecting circuit 36 and is fed to the coefficient table 43.

In the case that each of the unit delay circuits 37 and 38 operates to delay a pixel by one-pixel, an absolute value of the difference between scanning pixel values of opposite sides of a present fourth pixel of the actual scanning signal in the one-field preceding field from the interpolation field is produced from the fourth differential detecting circuit 36 as a fourth differential (horizontal differential) of the third pixel.

In the case that each of the unit delay circuits 37 and 38 operates to delay a scanning line by 1H (one-horizontal scanning time), an absolute value of the difference between pixel values of scanning lines on opposite sides of a central scanning line is produced from the fourth differential detecting circuit 36 as a differential (vertical differential) of the present third pixel.

The coefficient table 43 operates the mixing ratio of each of the adjacent first and third pixels on corresponding scanning lines of field adjacent on the time axis in accordance with the third differential of the input first pixel and the fourth differential of the input third pixel.

In the case that the third differential is larger than the fourth differential, the mixing ratio K3 of the third pixel is set in a range of $0.5 < K3 \leq 1$. If the fourth differential is larger than the third differential, the mixing ratio K3 of the third pixel is set in a range of $0 \leq K3 < 0.5$. When the third differential is equal to the fourth differential, the mixing ratio K3 of the third pixel is set about 0.5.

Namely, the coefficient table 43 sets the mixing ratio (1−K3) of the fourth pixel and the mixing ratio K3 of the third pixel so that the mixing ratio of the small absolute value of the differential becomes large.

The output of the 1H delay circuit 35 is applied to a mixing circuit 44 through a unit delay circuit 41, and the input signal is also applied to the mixing circuit 44 through the unit delay circuit 42.

The mixing circuit 44 multiplies the signal from the unit delay circuit 41 by K3 and multiplies the signal from the unit delay circuit 42 by (1−K2). The products are added together, and the added signal is output as a second interpolation scanning signal.

The operation of each interpolation circuit is hereinafter described with reference to FIG. 4. In the figure, the mark ○ designates an actual pixel, and the mark □ designates an interpolation pixel.

The operation of the intra-field interpolation processing circuit of FIG. 2 is described. For example in the odd field, following conditions are set.

Pixel values of pixels b1, b2, b3, b4, b5 . . . of the line n−1 are 0, 1, 2, 2, 2, . . . pixel values of pixels c1, c2, c3, c4, c5 . . . of the line n+1 are 0, 0, 0, 1, 2 . . . , and the unit delay circuits 11, 12, 17, 18 operate to delay the pixel by one pixel.

The first differential detecting circuit 10 produces absolute values of differences of pixel values (horizontal differential) 0, 0, 1, 2, 1 . . . between left and right adjacent pixels with respect to pixels c1, c2, c3, c4, c5 . . . of the line n+1 as a first differential. On the other hand, the second differential detecting circuit 16 produces absolute values of differences of pixel values (horizontal differential) 1, 2, 1, 0, 0, . . . between left and right adjacent pixels with respect to pixels b1, b2, b3, b4, b5 . . . of the line n−1 as a second differential.

Thus, for interpolation pixels B1, B2, B3, B4, B5 . . . of the interpolation line to be interpolated, absolute values of the horizontal differentials of vertically adjacent pixels are calculated.

The coefficient table 23 produces the mixing ratio K2 in accordance with the first and second differentials.

When the first differentials of the pixel values c1, c2, c3, c4, c5 . . . of the line n+1 are 0, 0, 1, 2, 1 . . . and the second differentials of pixel values b1, b2, b3, b4, b5 . . . of the line n−1 are 1, 2, 1, 0, 0, . . . mixing ratios K2 of the pixels b1 and c1, b2 and c2, b3 and c3, b4 and c4, b5 and c5 are set so that a large mixing ratio is applied to a small absolute value of differential, for example 0, 0, 0.5, 1, 1.

The mixing circuit 24 multiplies signals (pixel values 0, 1, 2, 2, 2, . . . of pixels b1, b2, b3, b4, b5 . . . of line n−1) supplied from the unit delay circuit 21 by K2 and multiplies signals (pixel values 0, 0, 0, 1, 2 . . . of pixels c1, c2, c3, c4, c5 . . . of line n+1) supplied from the unit delay circuit 22 by (1−K2) in accordance with the output of the coefficient table 23, and adds the products to produce interpolation values 0, 0, 1, 2, 2, . . . for interpolation pixels B1, B2, B3, B4, B5 . . . of the interpolation line n.

Namely, the first interpolation scanning signal is produced so that the present scanning signals (pixel values 0, 0, 0, 1, 2 . . . of pixels C1, C2, C3, C4, C5 . . . of line n+1) and 1H preceding scanning signals (pixel values 0, 1, 2, 2, 2 . . . of pixels b1, b2, b3, b4, b5 . . . of line n−1) are weighted and added together so that a large mixing ratio is applied to a small absolute value of the differential to produce a first interpolation scanning signal.

FIG. 6a shows the interpolation pixel values of the interpolation scanning signals and pixel values of vertically adjacent scanning signals. As shown in FIG. 6a, an interpolation picture which has not a zigzag slant contour is obtained. To the contrary, in the conventional interpolation method by the average interpolation, interpolation scanning signals are inferior in the slant contour as shown in FIG. 6b.

In the inter-field interpolation processing circuit of FIG. 3, a second interpolation scanning signal can be produced in the same method as the intra-field interpolation processing circuit of FIG. 2.

Although in the above described system, as differentials for a pair of pixels adjacent in space or in time (for example b3 and c3 of FIG. 4) for the interpolation pixel (B3 of FIG. 4), absolute values of the difference (horizontal differential) between pixel values of left and right adjacent pixels on the same line (b2 and b4 for b3 and c2 and c4 for c3) are used, as differentials for the pair of pixels (b3 and c3), absolute values (vertical differential) of differences between pixel values of two pixels adjacent in upper and lower lines (a3 and c3 for b3 and b3 and d3 for c3) may be used which has the same effect as the horizontal differential.

Figure 5:
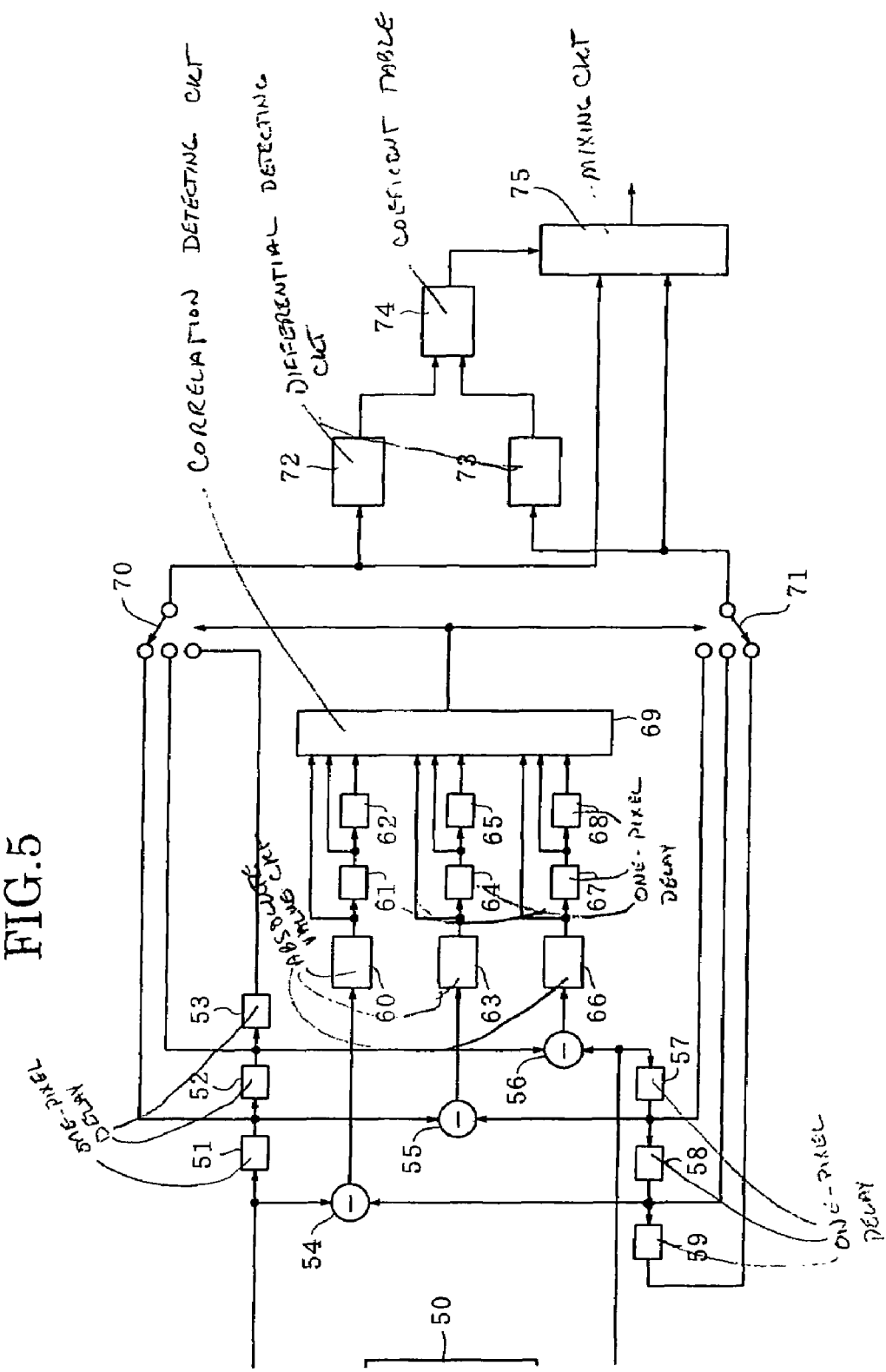
FIG. 5 is a block diagram of a system to which a second embodiment of the present invention is applied.

FIG. 5 shows the second embodiment of the present invention.

An interlace input signal is fed to a delay circuit 50, a subtracter 54, a one-pixel delay circuit 51. The delay circuit 50 is composed for delaying by 1H (one horizontal scanning time) when used for the intra-field interpolation processing circuit. On the other hand, when the delay circuit 50 is used for the inter-field interpolation processing circuit, the delay circuit 50 is composed to delay by one frame.

The output of the one-pixel delay circuit 51 is applied to a selector 70, a one-pixel delay circuit 52 and a subtracter 55. The output of the one-pixel delay circuit 52 is applied to the selector 70, a one-pixel delay circuit 53, and a subtracter 56, and the output of the one-pixel delay circuit 53 is applied to the selector 70.

The output of the delay circuit 50 is fed to the subtracter 56, a one-pixel delay circuit 57, and the output of the one-pixel delay circuit 57 is fed to the subtracter 55, a one-pixel delay circuit 58, and a selector 71. The output of the one-pixel delay circuit 58 is fed to the subtracter 54, a one-pixel delay circuit 59, and the selector 71, and the output of the one-pixel delay circuit 59 is fed to the selector 71.

The output of the subtracter 54 is applied to an absolute value circuit 60, the output of the absolute value circuit 60 is applied to a correlation detecting circuit 69 and a one-pixel delay circuit 61. The output of the one-pixel delay circuit 61 is fed to the correlation detecting circuit 69 and a one-pixel delay circuit 62, and the output of the one-pixel delay circuit 62 is fed to the correlation detecting circuit 69.

The output of the subtracter 56 is applied to an absolute value circuit 66 the output of which is applied to the correlation detecting circuit 69 and a one-pixel delay circuit 67. The output of the one-pixel delay circuit 67 is fed to the correlation detecting circuit 69 and a one-pixel delay circuit 68 the output of which is fed to the correlation detecting circuit 69.

Thus, fed to the correlation detecting circuit 69 are absolute values differences between a plurality of pairs of pixels, in which two pixels of each pair are adjacent on the time axis and in the space, interposing each pixel, with respect to a series of three interpolation pixels on the interpolation line.

The correlation detecting circuit 69 detects values of a pair of pixels in the direction wherein the sum of absolute values of the differences is minimum (namely the direction of a maximum correlation), and supplies the selectors 70 and 71 with a selection signal based on the detection.

The selectors 70 and 71 select values of a pair of pixels in the minimum absolute value direction in accordance with the selection signal from the correlation detecting circuit 69.

The output of the selector 70 is fed to a differential detecting circuit 72 and a mixing circuit 75, and the output of the selector 71 is fed to a differential detecting circuit 73 and the mixing circuit 75. The differential detecting circuits 72 and 73 calculate absolute values of the differences in the same manner as FIG. 2 or 3, which are fed to a coefficient table 74. The coefficient table 74 calculates a mixing ratio in accordance with the absolute values of the differences and applies it to a mixing circuit 75. The mixing circuit 75 operates to perform weighting and addition of pixel values from selectors 70 and 71 in accordance with the mixing ratio from the coefficient table 74 so that the mixing ratio for the small absolute value of the difference becomes large and produces an output as an interpolation scanning signal.

The operation of the circuit of FIG. 5 is described with reference to FIG. 4 hereinafter.

The delay circuit 50 is set to the 1H delay circuit as the intra-field interpolation processing circuit.

Pixel values of the pixels b1, b2, b3, b4, b5 . . . on the line n−1 of FIG. 4 are, for example 3, 5, 9, 6, 5 . . . , and pixel values of the pixels c1, c2, c3, c4, c5 . . . on the line n+1 are, for example 2, 4, 8, 5, 6 . . . .

The subtracter 54 produces in series the difference (3−8) between pixels b1 and c3, the difference (5−5) between pixels b2 and c4, the difference (9−6) between pixels b3 and c5. The absolute value circuit 60 calculates an absolute value (|9−6|) of the difference fed from the subtracter 54 and applies it to the correlation detecting circuit 69. The one-pixel delay circuits 61 and 62 feed an absolute value (|5−5|) of the one-pixel delayed difference and an absolute value (|3−8|) of the two-pixel delayed difference to the correlation detecting circuit 69.

The subtracter 55 produces in series the difference (5−4) between pixels b2 and c2, the difference (9−8) between pixels b3 and c3, the difference (6−5) between pixels b4 and c4. The absolute value circuit 63 calculates an absolute value (|6−5|) of the difference fed from the subtracter 55 and applies it to the correlation detecting circuit 69. The one-pixel delay circuits 64 and 65 feed an absolute value (|9−8|) of the one-pixel delayed difference and an absolute value (|5−4|) of the two-pixel delayed difference to the correlation detecting circuit 69.

The subtracter 56 produces in series the difference (9−2) between pixels b3 and c1, the difference (6−4) between pixels b4 and c2, the difference (5−8) between pixels b5 and c3. The absolute value circuit 66 calculates an absolute value (|5−8|) of the difference fed from the subtracter 56 and applies it to the correlation detecting circuit 69. The one-pixel delay circuits 67 and 68 feed an absolute value (|6−4|) of the one-pixel delayed difference and an absolute value (|9−2|) of the two-pixel delayed difference to the correlation detecting circuit 69.

The correlation detecting circuit 69 compares the sum of 8 obtained by adding together the absolute values of the differences |9−6|=3, |5−5|=0, |3−8|=5 fed from the absolute value circuit 60, one-pixel delay circuits 61 and 62.

The correlation detecting circuit 69 compares the sum of 3 obtained by adding together the absolute values of the differences |6−5|=1, |9−8|=1, |5−4|=1 fed from the absolute value circuit 63, one-pixel delay circuits 64 and 65, and the sum of 10 obtained by adding together the absolute values of the differences |5−8|=3, |6−4|=2, |9−2|=7 fed from the absolute value circuit 66, one-pixel delay circuits 67 and 68, and detects the couple of pixels (b3 and c3) having a minimum sum of the absolute values, feeds it to the selectors 70 and 71 as a selection signal.

The selector 70 selects the output of the one-pixel delay circuit 52 (the value of pixel c3) and outputs it. The selector 71 selects the output of the one-pixel delay circuit 58 (the value of pixel b3) and outputs it. The operation of differential detecting circuits 72 and 73, a coefficient table 74 and a mixing circuit 75 is the same as those of circuits of FIGS. 2 and 3.

As described above, since the correlation is compared in area to determine the interpolation direction, the interpolation accuracy can be more increased.

In accordance with the present invention, since the pixels on upper and lower line is with respect to a pixel to be interpolated are weighted and added together in accordance with differentials of upper and lower scanning lines or adjacent fields, an excellent picture without zigzag slant lines can be displayed.

While the invention has been described in conjunction with preferred specific embodiment thereof, it will be understood that this description is intended to illustrate and not limit the scope of the invention, which is defined by the following claims.

What is claimed is:

1. A method for interpolating between scanning lines of a video signal, the steps comprising:
   detecting values of actual pixels existing on upper and lower scanning lines of a pixel to be interpolated;
   obtaining a differential between pairs of the actual pixels;
   weighting each of the actual pixels in accordance with the differential;
   adding together the weighted values of the actual pixels, thereby providing value of the pixel to be interpolated,
   wherein a value of a pixel having a smaller differential is largely weighted than an adjacent pixel having a larger differential, and both values of the pixels are added together.

2. A method for interpolating between scanning lines of a video signal, the steps comprising:
   detecting values of actual pixels existing on upper and lower scanning lines of a pixel to be interpolated;
   obtaining a differential between pairs of the actual pixels;
   weighting each of the actual pixels in accordance with the differential;
   adding together the weighted values of the actual pixels, thereby providing value of the pixel to be interpolated,
   wherein values of a pair of pixels in a direction which has a most strong correlation are weighted and added together.

3. A method for interpolating between scanning lines of a video signal, the steps comprising:
   detecting values of actual pixels existing on corresponding scanning lines in fields adjacent on a time axis with respect to a field in which a pixel to be interpolated exists;
   obtaining a differential between pairs of the actual pixels;
   weighting each of the actual pixels in accordance with the differential;
   adding together the weighted values of the actual pixels;
   calculating a value of the pixel to be interpolated based on a sum of the addition, wherein a value of a pixel having a smaller differential is largely weighted than an adjacent pixel having a larger differential, and both values of the pixels are added together.

4. A method for interpolating between scanning lines of a video signal, the steps comprising:
   detecting values of actual pixels existing on corresponding scanning lines in fields adjacent on a time axis with respect to a field in which a pixel to be interpolated exists;
   obtaining a differential between pairs of the actual pixels;
   weighting each of the actual pixels in accordance with the differential;
   adding together the weighted values of the actual pixels; and
   calculating a value of the pixel to be interpolated based on a sum of the addition,
   wherein values of a pair of pixels in a direction which has a most strong correlation are weighted and added together.

5. A method for interpolating between scanning lines of a video signal, wherein an interpolation scanning signal is obtained from an input video signal, the interpolation scanning signal and an actual scanning signal in the input video signal are mutually inserted to provide a progressive scanning video signal, a first interpolation scanning signal is produced by an intra-field interpolation process, a second interpolation scanning signal is produced by an inter-field interpolation process, an interpolation pixel on a scanning line to be inserted between scanning lines is produced by weighting and adding together the first and second interpolation scanning signals, the method comprising:
   producing the interpolation pixel of the first interpolation scanning signal by weighting and adding together adjacent pixels on upper and lower adjacent actual scanning lines in accordance with differentials between the adjacent pixels; and producing the interpolation pixel of the second interpolation scanning signal by weighting and adding together adjacent pixels on actual scanning lines in forward and rearward adjacent fields in accordance with differentials between the adjacent pixels, wherein the value of the interpolation pixel having a smaller differential of each of the first and second interpolation scanning signal is produced by largely weighting than an adjacent pixel having a larger differential, and by adding together both values of the pixels.

6. A method for interpolating between scanning lines of a video signal, wherein an interpolation scanning signal is obtained from an input video signal, the interpolation scanning signal and an actual scanning signal in the input video signal are mutually inserted to provide a progressive scanning video signal, a first interpolation scanning signal is produced by an intra-field interpolation process, a second interpolation scanning signal is produced by an inter-field interpolation process, an interpolation pixel on a scanning line to be inserted between scanning lines is produced by weighting and adding together the first and second interpolation scanning signals, the method comprising:

producing the interpolation pixel of the first interpolation scanning signal by weighting and adding together adjacent pixels on upper and lower adjacent actual scanning lines in accordance with differentials between the adjacent pixels; and producing the interpolation pixel of the second interpolation scanning signal by weighting and adding together adjacent pixels on actual scanning lines in forward and rearward adjacent fields in accordance with differentials between the adjacent pixels, wherein values of a pair of pixels in a direction which has a most strong correlation are weighted and added together, thereby producing the value of the interpolation pixel of the first interpolation scanning signal, and values of a pair of pixels in a direction which has a most strong correlation are weighted and added together, thereby producing the value of the interpolation pixel of the second interpolation scanning signal.

* * * * *